(12) United States Patent
Richards

(10) Patent No.: US 9,019,350 B2
(45) Date of Patent: Apr. 28, 2015

(54) STEREO RECTIFICATION METHOD

(75) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 454 days.

(21) Appl. No.: 13/445,454

(22) Filed: Apr. 12, 2012

(65) Prior Publication Data

US 2013/0271578 A1  Oct. 17, 2013

(51) Int. Cl.
*H04N 13/02* (2006.01)
*G06T 15/00* (2011.01)
*G06T 5/00* (2006.01)
*G06T 5/50* (2006.01)

(52) U.S. Cl.
CPC . *G06T 5/006* (2013.01); *G06T 5/50* (2013.01); *G06T 2207/10012* (2013.01); *G06T 2207/30244* (2013.01)

(58) Field of Classification Search
CPC .... H04N 13/0242; G06T 19/00; G06T 17/20; G06T 17/00; G06T 15/10; G06T 15/00
USPC ............................................ 348/47; 345/419
See application file for complete search history.

(56) References Cited

U.S. PATENT DOCUMENTS

| 7,142,726 | B2 | 11/2006 | Ziegler et al. |
| 7,643,067 | B2 | 1/2010 | Jeon et al. |
| 2010/0020178 | A1* | 1/2010 | Kleihorst ................ 348/175 |
| 2010/0329543 | A1* | 12/2010 | Li et al. ................ 382/154 |
| 2012/0069019 | A1* | 3/2012 | Richards ................ 345/421 |

FOREIGN PATENT DOCUMENTS

EP  2 204 769 A1  7/2010

OTHER PUBLICATIONS

Lin Guo-Yu et al., "A robust Epipolar Rectification Method of Stereo Pairs", Measuring Technology and Mechatronics Automation (ICMTMA), 2010 International Conference On, IEEE< Piscataway, NJ, USA, Mar. 13, 2010 (pp. 322-326).

Kumar S. et al., "Stereo Rectification of Uncalibrated and Heterogeneous Images", Pattern Recognition Letters, Elsevier, Amsterdam, NL, vol. 31, No. 11, Aug. 1, 2010 (pp. 1445-1452).

(Continued)

*Primary Examiner* — Dave Czekaj
*Assistant Examiner* — Tsion B Owens
(74) *Attorney, Agent, or Firm* — Christie, Parker & Hale, LLP

(57) ABSTRACT

A method for stereo rectifying a pair of images include: for each image of the pair of images, determining a position of an epipole in an image plane associated with a first camera orientation of a camera that captures the image; for each image of the pair of images, positioning the epipole in a center of a virtual image plane associated with a second camera orientation of the camera; subsequent to the positioning, aligning the pair of images relative to each other by rotating around a stereo base line that intersects the epipoles of the pair of images, and rotating the virtual image planes to position the virtual image plane substantially parallel to the stereo base line and their normal vectors substantially parallel to each other so as to obtain a stereo rectified pair of image planes. An embodiment of the invention also relates to a method and system for accurately determining the epipoles when they are unknown.

18 Claims, 16 Drawing Sheets

(56) References Cited

OTHER PUBLICATIONS

Papadimitriou, "Epipolar Line Estimation and Rectification for Stereo Image Pairs", IEEE Transactions on Image Processing, IEEE Service Center, Piscataway, NJ, U.S. vol. 5, No. 4 Apr. 1, 1996 (pp. 672-676).

Written Opinion of the International Searching Authority for International Application No. PCT/US2013/025789, filed Feb. 12, 2013, Written Opinion of the International Searching Authority mailed Jun. 18, 2013 (5 pgs.).

International Search Report for International Application No. PCT/US2013/025789, filed Feb. 12, 2013, International Search Report dated Jun. 10, 2013 and mailed Jun. 2013 (4 pgs.)

\* cited by examiner

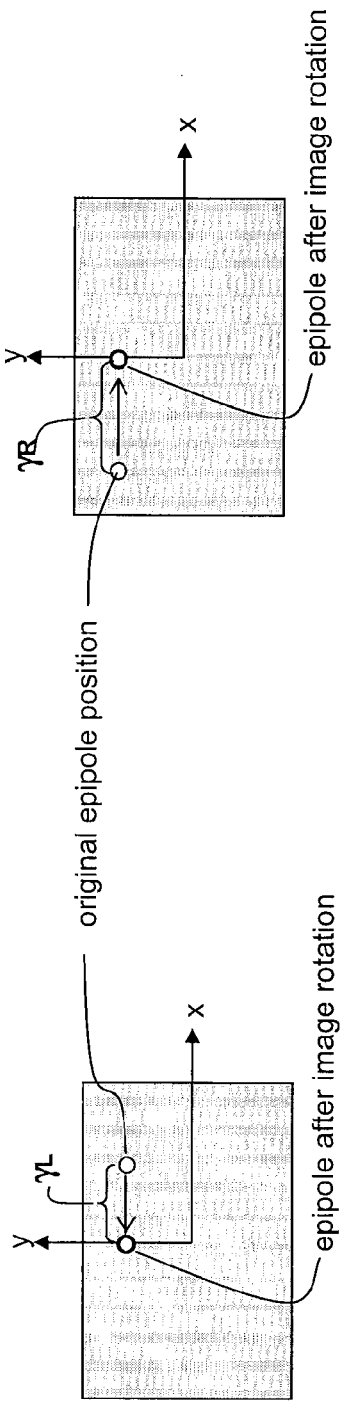
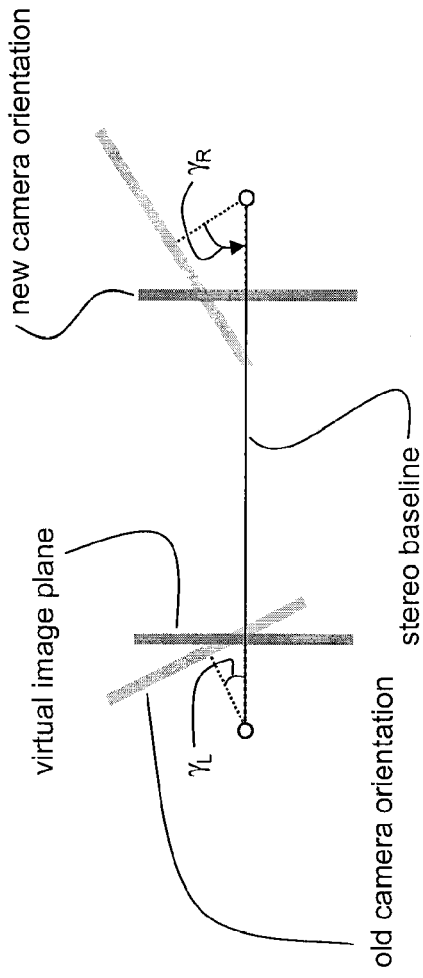
FIGURE 5a
FIGURE 5b
FIGURE 5c

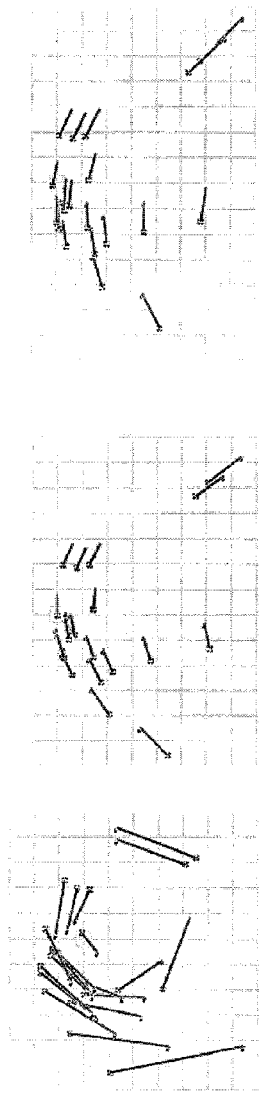
FIGURE 12a
FIGURE 12b
FIGURE 12c
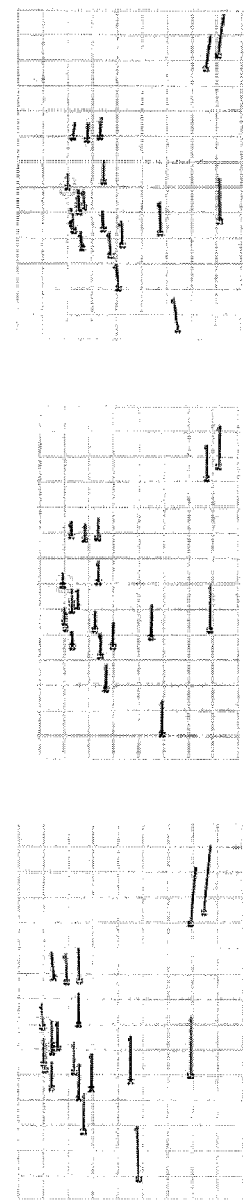
FIGURE 12d
FIGURE 12e
FIGURE 12f
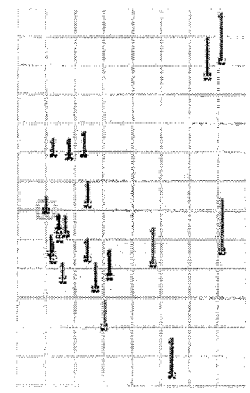
FIGURE 12i
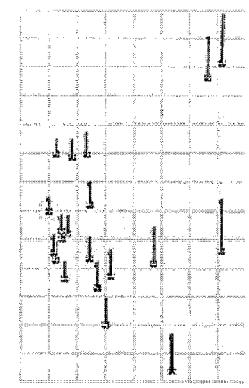
FIGURE 12h
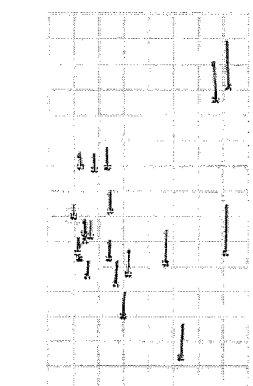
FIGURE 12g

STEREO RECTIFICATION METHOD

BACKGROUND

This present disclosure relates to an image processing system and methods.

In stereo vision, a three dimensional model of a scene is reconstructed from two images that are taken some distance apart by essentially identical rectilinear (i.e. distortion free) cameras. The separation distance, and direction, is known as the stereo baseline. In the most common case, the different images are created by moving a single camera from one location to another, separated by the stereo baseline.

Because the camera moves between exposures, the objects in the scene will show relative motion with respect to each other. This apparent parallax image motion is a function of, among other things, the distance of the objects from the stereo baseline. With respect to parallax, the further away an object is the smaller will be the true parallax motion. By measuring these true parallax motions for multiple objects it is possible to reconstruct their three dimensional relationships within the natural scene.

If the camera is moved from the first position to the second without any change in its orientation, then the apparent parallax motions remain well behaved and three dimensional scene reconstruction is relatively easy. However, if the camera rotates when moved between the two positions the parallax motion may become twisted into a swirl pattern, as shown in FIG. 1. The apparent motions of features from the first to the second image are shown as "flow lines" in FIG. 1. Three dimensional reconstruction can be very difficult in this circumstance.

In practice, the camera pan, tilt and roll angles have coupled impacts on the imagery. For example, camera pan and tilt will produce image rotations which emulate roll. These couplings are generally difficult to untangle. FIG. 1 shows these rotation coupling effects as well as the effects of the translation of the camera in the usual three spatial dimensions.

All together there are nine degrees of freedom for the two camera position system: pan, tilt and roll for each camera position, and x, y, z relative camera translation. In many cases the distance that the camera has traveled is not known. Also, the combined tilt of the cameras with respect to horizontal may not be known either. Thus, there may be from six to nine degrees of freedom that could be discovered during the course of the stereo imaging.

Existing methods for extracting three dimensional information from arbitrary pairs of images of a scene assume that the initial camera poses (pan, tilt, roll and x, y, z position) are unknown but may be extracted from the imagery. These existing methods are generally based on the construction and refinement of the Essential Matrix, which can be used to determine the direction of the stereo baseline and the relative orientations of the cameras with respect to the stereo baseline. The relative camera orientation is defined as the camera pose. The Essential Matrix is one of the most useful mathematical tools for creating stereo models from pairs of images.

However, these existing methods generally require extensive non-real-time computation and often produce unsatisfactory results. Furthermore, these methods are not satisfactory for forming a high precision and fully automated real time three dimensional model from video image streams.

SUMMARY

In one embodiment, there is provided a method for stereo rectifying a pair of images comprising: for each image of the pair of images, determining a position of an epipole in an image plane associated with a first camera orientation of a camera that captures the image; for each image of the pair of images, positioning the epipole in a center of a virtual image plane associated with a second camera orientation of the camera; subsequent to the positioning, aligning the pair of images relative to each other around a stereo base line that intersects the epipoles of the pair of images, and rotating the virtual image planes to position the virtual image planes substantially parallel to the stereo base line and their normal vectors substantially parallel to each other so as to obtain a stereo rectified pair of image planes.

In another embodiment, there is provided an article of manufacture comprising a physical, non-transitory computer readable medium encoded with machine executable instructions for performing a method for stereo rectifying a pair of images, the method comprising: for each image of the pair of images, determining a position of an epipole in an image plane associated with a first camera orientation of a camera that captures the image; for each image of the pair of images, positioning the epipole in a center of a virtual image plane associated with a second camera orientation of said camera; subsequent to the positioning, aligning the pair of images relative to each other around a stereo base line that intersects the epipoles of the pair of images, and rotating the virtual image planes to position the virtual image planes substantially parallel to the stereo base line and their normal vectors substantially parallel to each other so as to obtain a stereo rectified pair of image planes.

In yet another embodiment, there is provided a method for processing a pair of images comprising: stereo rectifying the pair of images by for each image of the pair of images, determining a position of an epipole in an image plane associated with a first camera orientation of a camera that captures the image; for each image of the pair of images, positioning the epipole in a center of a virtual image plane associated with a second camera orientation of the camera; subsequent to the positioning, aligning the pair of images relative to each other around a stereo base line that intersects the epipoles of the pair of images, and rotating the virtual image planes to position the virtual image planes substantially parallel to the stereo base line and their normal vectors substantially parallel to each other so as to obtain a stereo rectified pair of image planes, and for each image of the pair of images, performing one or more homographic transformations on the image to map the entire image onto the stereo rectified image plane.

These and other embodiments, features, and characteristics of the present disclosure, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not a limitation of the disclosure. In addition, it should be appreciated that structural features shown or described in any one embodiment herein can be used in other embodiments as well. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 5a-d show various transformations performed in accordance with FIG. 4;

FIGS. 12a-i show experimental results that illustrate how rapid convergence to excellent stereo rectification can be obtained on an ensemble of 20 features by applying the method of FIG. 10.

DETAILED DESCRIPTION

According to one or more embodiments there is provided a method for stereo rectifying a pair of images, the method comprising: for each image of the pair of images, determining a position of an epipole in an image plane associated with a first camera orientation of a camera that captures the image; for each image of the pair of images, positioning the epipole in a center of a virtual image plane associated with a second camera orientation of said camera; subsequent to the positioning, aligning the pair of images relative to each other around a stereo base line that intersects the epipoles of the pair of images, and rotating the virtual image planes to position the virtual image planes substantially parallel to the stereo base line and their normal vectors substantially parallel to each other so as to obtain a stereo rectified pair of image planes.

Figure 1:
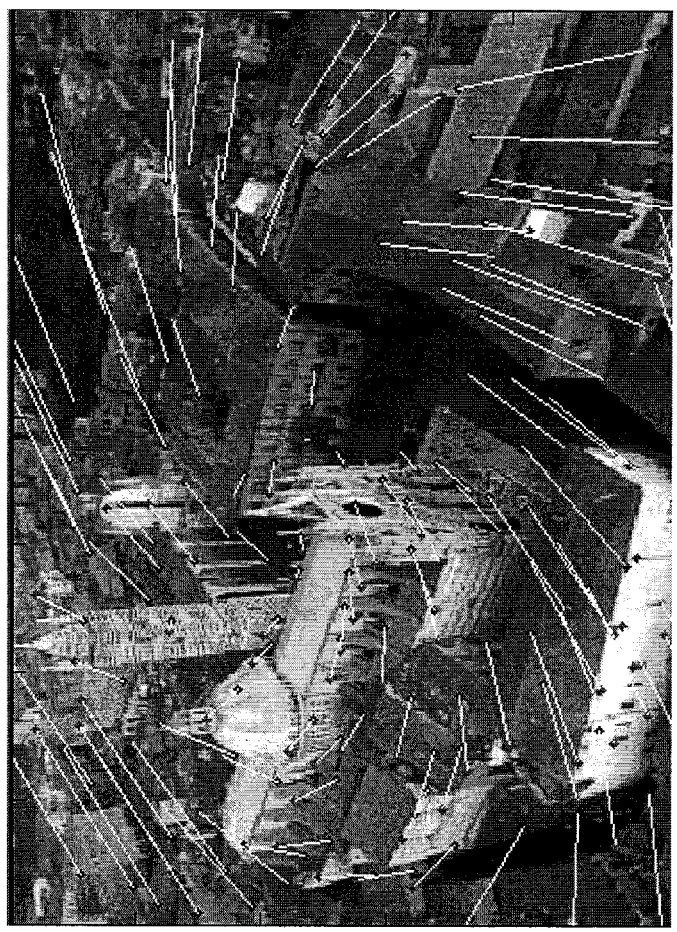
FIG. 1 shows apparent motions of features or flow lines from a first to a second image of a scene.
Figure 2:
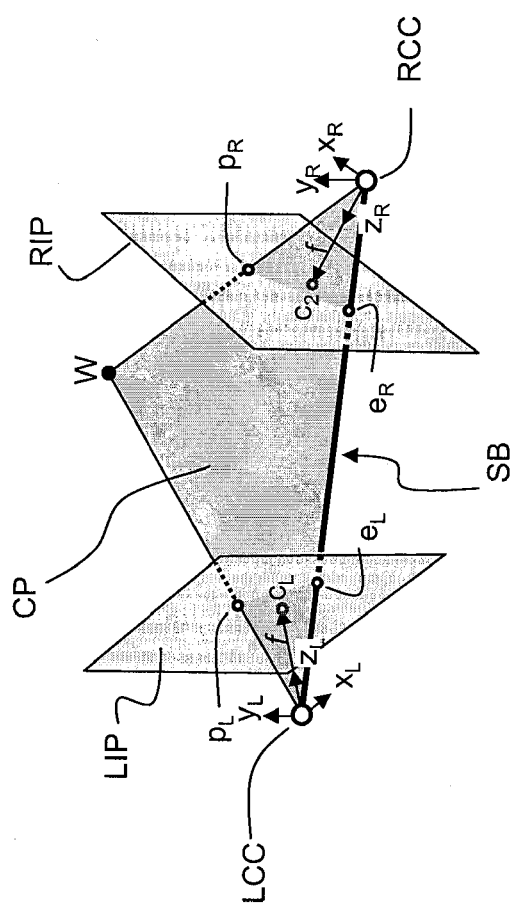
FIGS. 2 and 3 show the geometrical relationships for a moving camera in two different positions or for two arbitrarily oriented cameras.

FIG. 2 shows how a camera, in two different positions, views one object in the scene. The camera is moved from the left position to the right position (or vice versa). The camera, in the two positions, is observing the point, W, in the outside world, which is some distance outwards from the camera. It will be appreciated that the present discussion is also applicable to two or more different cameras that view the object W, instead of a single moving camera.

The camera is defined by a camera center and an image plane. FIG. 2 shows the right camera center RCC, left camera center LCC, right image plane RIP and left image plane LIP. In a real camera, the true camera center is the nodal point of the lens and is in front of the focal plane (or true image plane). This results in the projection of an inverted image onto the focal plane. For convenience, the camera center (i.e. lens nodal point) is defined to be a point behind an artificially defined image plane. This results in an upright image.

The camera has a local x, y, z coordinate system (attached to the camera) which is centered at the camera center. In this local coordinate system there is a vector, z, the principal vector, from the camera center to the center of the image plane. This z vector is perpendicular to the image plane and touches the image plane at the image center point, c. The distance from the camera center to the image plane, f, is the focal length of the camera. In this local coordinate system the x and y axes are parallel to the image plane. Conventionally, the y-axis lies in the vertical direction.

FIG. 2 also shows the stereo baseline, which is the line that joins the two camera centers. In one embodiment, it is this axis which makes it possible to reconstruct three dimensional scenes from the two camera positions. This axis is also the measurement baseline for distance measurement. The points where the stereo baseline penetrates the left and right image planes are called the left and right epipoles ($e_L$ and $e_R$).

The two cameras are observing a common world point, W. This point, together with the two camera centers, defines a plane, referred to as the common plane CP. Because the baseline also joins the two camera centers, the stereo baseline SB therefore lies in this plane CP. It will be appreciated that there are an infinite number of points which lie in this common plane. Any two of these points will form the ends of a line in the image plane.

As can be seen in FIG. 2, the ray from a camera center to the common point, W passes through the image plane at the point, p. There will be a point $p_L$ for the left image and a point $p_R$ for the right image.

The scene object, at point, W, as seen by the camera in either of its positions, has vector coordinates $X_{WL}, Y_{WL}, Z_{WL}$ or $X_{WR}, Y_{WR}, Z_{WR}$ with respect to the camera centers. From a single camera position, it is not possible to determine how far away the object W is from the camera center. The direction may be known, but not the distance. The direction with respect to the camera's orientation is known from the location of the image of W on the image plane. The ray between the camera center and W intercepts the image plane at the vector location $x_p, y_p, f$. Thus, the image location of this object can be defined by the vector $p=[x_p, y_p, f]$. The focal length of the camera can be adjusted to unity: $f=1$. The rescaling is the result of dividing all the vector components by f. This is a reasonable rescaling because, in many cases, the focal length is unknown, but the angles to various object locations can be measured. The abstract image of W is therefore defined by the vector $[x_p, y_p, 1]$. Here, the focal length is retained as part of the image vector.

Figure 3:
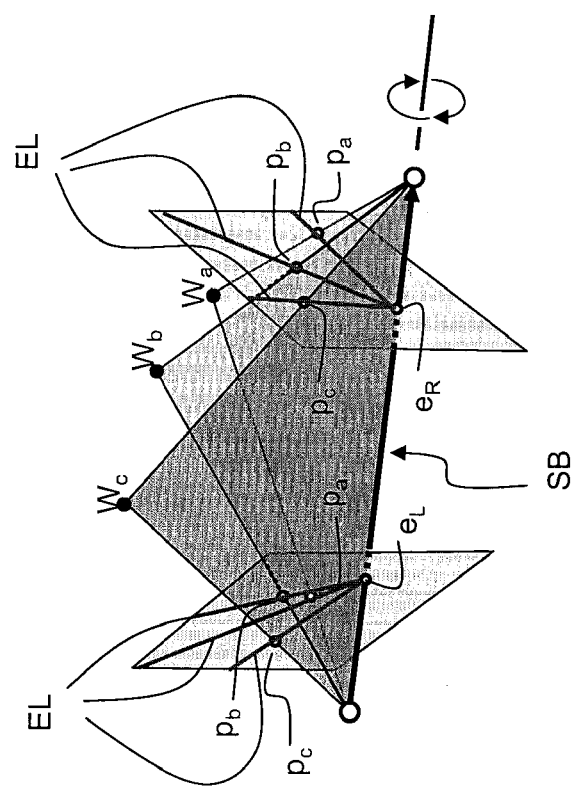

In general, there will be a multitude of world points, $W_a$, $W_b$, $W_c$, in the observed far field. Each of these points will have its own common plane and each of these common planes will intersect the stereo baseline. As a result, these planes radiate out from the stereo baseline. FIG. 3 shows the general configuration. This ensemble of radiating planes is referred to as a pencil of planes and each of these planes may be referred to as a pencil plane. As seen in FIG. 3, the rays from camera centers to the common points, $W_a$, $W_b$, $W_c$, pass through an image plane at points, $p_a, p_b, p_c$, for the right and left cameras Objects, or features, $W_a$, $W_b$, $W_c$, in the far field are connected to the camera center by light rays. The images of these features occur where their rays pass through the image plane at points, $p_a, p_b, p_c$. Each far field feature is one corner of a triangle, with the other corners being the camera centers. Such a triangle is part of an extended plane which passes through the stereo baseline SB. Where this feature plane also passes through the image plane, this intersection is defined as an epipolar line EL. Each plane and feature has a corresponding epipolar line EL which radiates from the epipole. Specifically, as shown in FIG. 3, the epipolar lines EL radiate from the epipoles $e_R$, $e_L$, where the stereo baseline SB penetrates through the image planes RIP, LIP. These radiating epipolar lines make up a kind of "star," or fan, of rays. An epipolar star corresponds to the intersection of the pencil planes with the image plane. It will be appreciated that when the cameras face each other, so that the image planes are parallel, the epipolar stars, in the left and right cameras, are mirror images of each other.

The relative camera geometry of FIGS. 2 and 3 has the cameras pointed roughly towards each other. This relative orientation ensures that the epipoles will be properly placed in the images. However, it will be appreciated that, in other situations, the cameras may splay so that they point somewhat away from each other. In this case the stereo baseline SB passes through the camera centers before intersecting the image planes. Thus, the epipoles move to the opposite sides of the images.

In another case, the cameras may both point perpendicular to the stereo baseline SB. In this case, the epipoles are at infinity and it is no longer possible to define finite epipoles. As long as the cameras are also parallel—a condition defined as stereo rectified—the relative distances to various objects can be determined by their relative parallax motions. However, if the cameras have relative tilt (the cameras are rotated through different angles around the stereo baseline so that they are no longer parallel to each other), then the image motions are confused. Without correction to the stereo rectified camera position, range measurement becomes difficult.

Stereo rectification involves aligning the cameras perpendicular to the stereo baseline SB and parallel to each other. When this is done all the features in the left camera will move along parallel, and horizontal, lines to reach their positions in the right camera. The epipoles $e_R$, $e_L$, will be at infinity in both cameras. In practice, the cameras (or a single moving camera) will typically not be in stereo rectified position when the images are formed. Virtual, or homographic, mapping of the original images should therefore be performed to create the desired pair of stereo rectified images.

Figure 4:
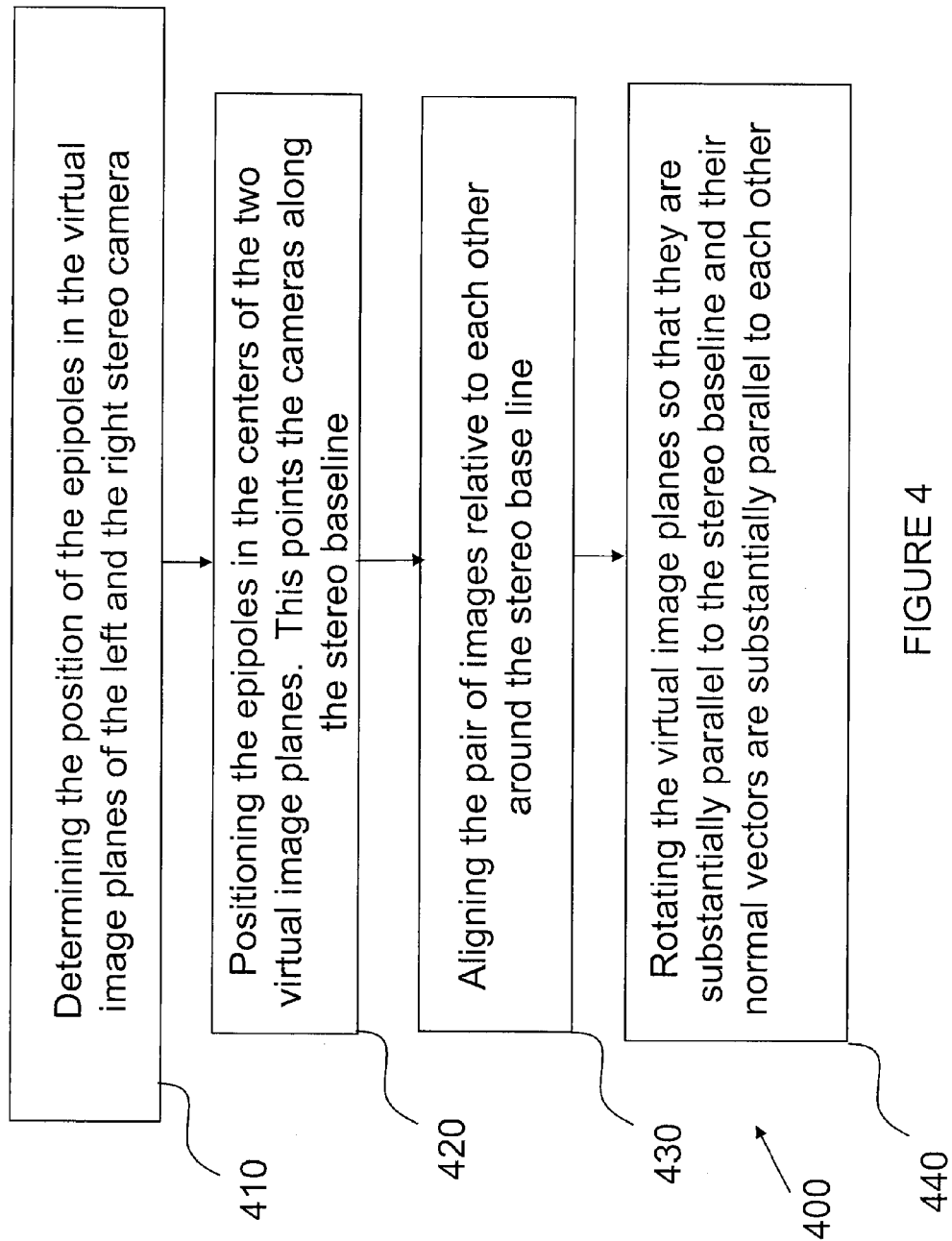
FIG. 4 shows a method for stereo rectifying a pair of images in accordance with an embodiment.

Referring to FIG. 4, this figure shows a method 400 for stereo rectifying a pair of images.

Referring to operation 410, for each image of the pair of images (taken by the two different camera positions or by two different cameras), the position or location of the epipole in the image plane of the camera is determined. The position of the epipole is determined for the first or original orientation/pose of the camera.

The location of the epipole in the image plane provides the direction of the stereo baseline as it departs from the camera center. There are multiple ways of determining the location of the epipole. In one embodiment, a further Singular Value Decomposition of the Essential Matrix can be used to determine the epipole location. In another embodiment, a practical engineering alternative is to use an Inertial Measurement Unit (IMU) to measure the change in camera pose as the camera moves from one location to another.

Upon determining, the epipole locations in the left and right images, a vector direction from the camera center down the stereo baseline is determined. This vector (in the image plane) can be used as a geometric standard and further operations are performed with respect to this stereo baseline vector. All operations are repeated for both images.

At operation 420, the epipole is centered in the virtual plane of each image. This can be done by performing a sequence of virtual camera rotations from the true poses or orientations (first orientations) of the cameras to virtual poses (or second orientations) which are aligned along the stereo baseline.

In one embodiment, homographic image rotations are performed on the right and left images, as shown respectively in FIGS. 5a-b. Those rotations are equivalent to virtual rotations of each camera about its y-axis through an angle gamma ($\gamma_L$ and $\gamma_R$) to place their epipoles on their y-axis.

For the left image, the image is rotated clockwise through an angle $\gamma_L$ as defined in FIG. 5a. This rotation includes the local coordinate system. This is a perspective transformation (or homography). In one embodiment, the rotated components are normalized with a scale factor. The general form is:

$$\begin{bmatrix} x_1 \\ y_1 \\ f \end{bmatrix} = \text{scale}(x_0, y_0, f) \begin{bmatrix} \cos(\gamma_L) & 0 & -\sin(\gamma_L) \\ 0 & 1 & 0 \\ \sin(\gamma_L) & 0 & \cos(\gamma_L) \end{bmatrix} \begin{bmatrix} x_0 \\ y_0 \\ f \end{bmatrix} \quad (1)$$

Where (xo, yo, f) are the original coordinates of an image point and (x1, y1, f) are the coordinates of the image point after rotation. $\gamma_L$ represents the rotation angle.

This can be achieved with the following scale factor:

$$\begin{bmatrix} x_1 \\ y_1 \\ f \end{bmatrix} = \frac{f}{(x_0 \sin(\gamma_L) + f \cos(\gamma_L))} \begin{bmatrix} \cos(\gamma_L) & 0 & -\sin(\gamma_L) \\ 0 & 1 & 0 \\ \sin(\gamma_L) & 0 & \cos(\gamma_L) \end{bmatrix} \begin{bmatrix} x_0 \\ y_0 \\ f \end{bmatrix} \quad (2)$$

Where (x1, y1, f) are the coordinates of an image point and (x2, y2, f) are the coordinates of the image point after rotation. $\gamma_L$ represents the rotation angle.

The situation in the right image is illustrated in FIG. 5b.

The image rotation (including the local coordinate system) is counter-clockwise, to bring the epipole onto the new y-axis. The normalized rotation matrix for each pixel element of the right image is:

$$\begin{bmatrix} x_1 \\ y_1 \\ f \end{bmatrix} = \frac{f}{(-x_0 \sin(\gamma_R) + f \cos(\gamma_R))} \begin{bmatrix} \cos(\gamma_R) & 0 & \sin(\gamma_R) \\ 0 & 1 & 0 \\ -\sin(\gamma_R) & 0 & \cos(\gamma_R) \end{bmatrix} \begin{bmatrix} x_0 \\ y_0 \\ f \end{bmatrix} \quad (3)$$

Where (x1, y1, f) are the coordinates of an image point and (x2, y2, f) are the coordinates of the image point after rotation. $\gamma_R$ represents the rotation angle.

A top view of these rotations is illustrated by FIG. 5c.

Figure 5D:
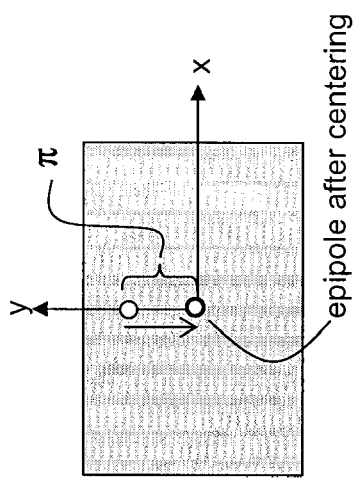

After performing the rotations shown in FIGS. 5a-c, each camera is rotated about its local x-axis so as to bring its epipole to the camera center. This is shown in FIG. 5d. Thus, after this next rotation the image planes will be perpendicular to the stereo baseline.

For the left image, the coordinates of the image points are (after normalization):

$$\begin{bmatrix} x_2 \\ y_2 \\ f \end{bmatrix} = \frac{f}{(x_1 \sin(\pi_L) + f \cos(\pi_L))} \begin{bmatrix} 1 & 0 & 0 \\ 0 & \cos(\pi_L) & -\sin(\pi_L) \\ 0 & \sin(\pi_L) & \cos(\pi_L) \end{bmatrix} \begin{bmatrix} x_1 \\ y_1 \\ f \end{bmatrix} \quad (4)$$

Where (x1, y1, f) are the coordinates of an image point and (x2, y2, f) are the coordinates of the image point after rotation. $\Pi_L$ represents the rotation angle.

For the right image, the coordinates of the image points are:

$$\begin{bmatrix} x_2 \\ y_2 \\ f \end{bmatrix} = \frac{f}{(x_1 \sin(\pi_R) + f \cos(\pi_R))} \begin{bmatrix} 1 & 0 & 0 \\ 0 & \cos(\pi_R) & -\sin(\pi_R) \\ 0 & \sin(\pi_R) & \cos(\pi_R) \end{bmatrix} \begin{bmatrix} x_1 \\ y_1 \\ f \end{bmatrix} \quad (5)$$

Where (x1, y1, f) are the coordinates of an image point and (x2, y2, f) are the coordinates of the image point after rotation. $\Pi_R$ represents the rotation angle.

This operation insures that both cameras or image planes have a controlled orientation with respect to each other. In a subsequent operation the cameras will be reoriented to be parallel to each other instead of facing each other.

The effect of these rotations will be to move the epipoles to the centers of the two image planes.

The preceding sequence rotates first about the y-axis and then about the x-axis to bring the epipole to the camera's image center. In another embodiment, it is envisioned to first rotate the image plane about the x-axis and then about the y-axis. Even though these rotation matrices do not commute, the end result is the same. The reason is that the epipole is being brought to a neutral location—namely, the camera image center.

Referring back to FIG. 4, the method proceeds to operation 430 where the pair of images are aligned relative to each other around the stereo base line.

The virtual camera rotations, thus far, have partially decoupled the relative camera roll and pan angles. These corrections have both been made with respect to the stereo baseline SB, as represented by the epipole locations in the image planes RIP, LIP. However, there still remains one coupling factor. The virtual cameras at this point face each other, but they are not oriented so that the x and y axis of one camera matches the x and y axis of the companion camera. This results in a relative roll angle of one camera with respect to the other. To correct this relative roll, an outside agent is used in one embodiment. Such an outside agent can be any real object out in the space of observation.

Specifically, in order to correct this residual relative roll, a common reference object is selected in both the left and right virtual images and then the virtual cameras are rotated around the stereo baseline until the images of the object lie on the x-axis of both virtual cameras. In the process of rotating the virtual cameras according to the previous operations, camera tilt has been automatically converted to camera roll about the stereo baseline SB. The stereo baseline SB now lies along the local z-axis of each reoriented virtual camera. Thus, by bringing the same object to the x-axis of each camera, the cameras will be aligned in roll about the z-axis stereo baseline.

In one embodiment, the selected object is the one which is furthest away. Because of the nature of perspective geometry, this object is also likely to be the one which is closest to the true horizon. By rotating the virtual camera (or the virtual image) so that this object lies on the x-axis, the camera will be at least approximately pointing at the true horizon.

Figure 6A:
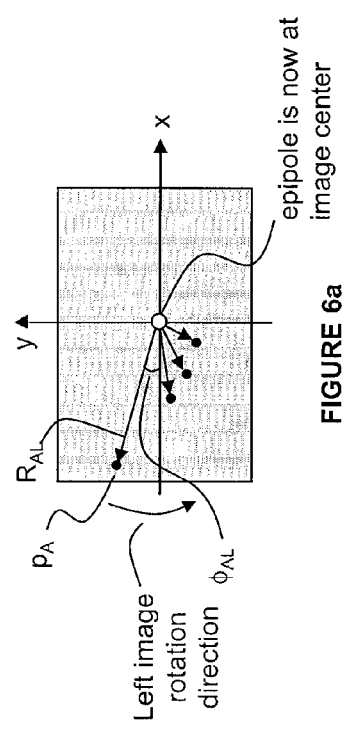
FIGS. 6a-b show an image rotation performed in accordance with FIG. 4.

In one embodiment, the left camera epipolar star is oriented so that it matches the (mirror image) of the right camera epipolar star. The starting situation for the left camera is illustrated by FIG. 6a. An object, A, is arbitrarily selected as the reference object.

The image is rotated so that the object, at radius $R_{AL}$, is brought onto the x-axis. After the rotation the left image will be as in FIG. 6b.

It will be appreciated that the x component of $R_{AL}$ is negative in this left image. The y-axis of $R_{AL}$ component is now zero.

Since a rotation around the local z-axis has been performed, there is no need to rescale the rotation matrix. The rotation, therefore, takes the form:

$$\begin{bmatrix} x_4 \\ y_4 \\ f \end{bmatrix} = \begin{bmatrix} \cos(\varphi_L) & -\sin(\varphi_L) & 0 \\ \sin(\varphi_L) & \cos(\varphi_L) & 0 \\ 0 & 0 & 1 \end{bmatrix} \begin{bmatrix} x_3 \\ y_3 \\ f \end{bmatrix} \quad (6)$$

Where (x3, y3, f) are the coordinates of an image point and (x4, y4, f) are the coordinates of the image point after rotation. $\phi_L$ represents the rotation angle.

The same procedure is followed for the right camera. The right camera image starts out like FIG. 7a. We pick the same far field object as our orientation reference, then rotate the star image until this object lies on the x-axis. FIG. 7b shows the right image after rotation.

Figure 6B:
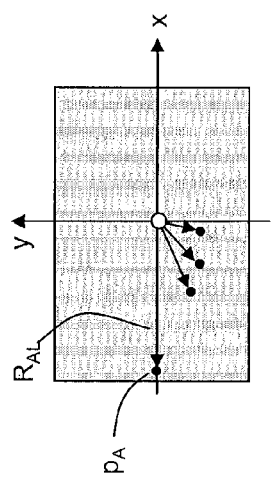
Figure 7A:
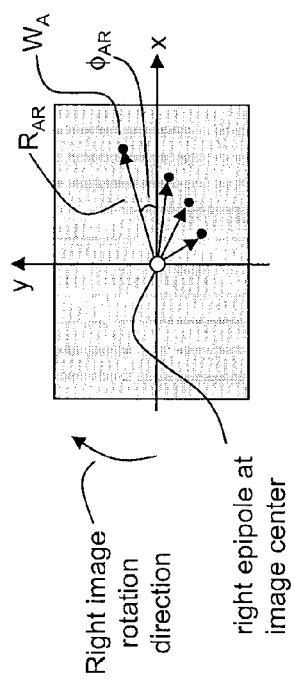
FIGS. 7a-b show an image rotation performed in accordance with FIG. 4.
Figure 7B:
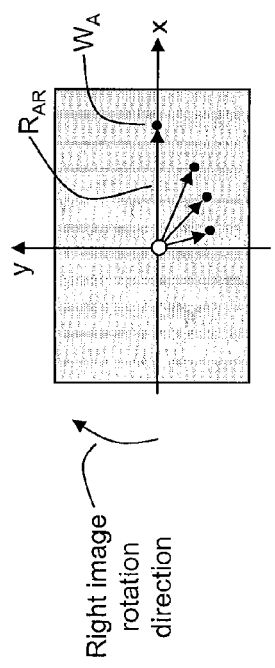

Comparison of FIGS. 7a and 7b with FIGS. 6a and 6b shows that the corresponding patterns of points are not identical. This is because the various objects in the scene actually have different x, y, z locations in the left and right local coordinate systems. Thus, they project differently onto the image planes of the left and right virtual cameras. However, the angles between the rays to the various points will now be the same for the left and right cameras. This is extremely useful in assuring that the cameras are indeed pointing along the stereo baseline. Further, this can be used to correct any residual errors in the estimation of the locations of the epipoles.

The rotation matrix for the right hand virtual camera rotation is:

$$\begin{bmatrix} x_4 \\ y_4 \\ f \end{bmatrix} = \begin{bmatrix} \cos(\varphi_R) & \sin(\varphi_R) & 0 \\ -\sin(\varphi_R) & \cos(\varphi_R) & 0 \\ 0 & 0 & 1 \end{bmatrix} \begin{bmatrix} x_3 \\ y_3 \\ f \end{bmatrix} \quad (7)$$

Where (x3, y3, f) are the coordinates of an image point and (x4, y4, f) are the coordinates of the image point after rotation. $\phi_R$ represents the rotation angle.

Referring back to FIG. 4, the method proceeds to operation 440 where the virtual image planes are rotated to position the virtual image planes substantially parallel to the stereo base line and their normal vectors substantially parallel to each other so as to obtain a stereo rectified image plane for each image.

Specifically, after aligning the virtual cameras, those virtual cameras can be rotated through 90° about the local y-axes to bring the cameras into stereo rectification. The matrices to do this are as follows:

For the left camera, the virtual rotation is:

$$\begin{bmatrix} x_5 \\ y_5 \\ f \end{bmatrix} = \frac{-f}{x_4} \begin{bmatrix} 0 & 0 & -1 \\ 0 & 1 & 0 \\ 1 & 0 & 0 \end{bmatrix} \begin{bmatrix} x_4 \\ y_4 \\ f \end{bmatrix} \quad (8)$$

Where (x5, y5, f) are the coordinates of an image point and (x4, y4, f) are the coordinates of the image point after rotation.

For the right camera, the virtual rotation is:

$$\begin{bmatrix} x_5 \\ y_5 \\ f \end{bmatrix} = \frac{f}{x_4} \begin{bmatrix} 0 & 0 & 1 \\ 0 & 1 & 0 \\ -1 & 0 & 0 \end{bmatrix} \begin{bmatrix} x_4 \\ y_4 \\ f \end{bmatrix} \quad (9)$$

Where (x5, y5, f) are the coordinates of an image point and (x4, y4, f) are the coordinates of the image point after rotation.

After performing operations 410-440, the camera pose will be stereo rectified. The sequence of image remappings and rotations shown in method 400 automatically disentangles the couplings among the pan, tilt and roll angle effects.

It will be appreciated that the transformations of FIG. 4 are done on the feature points, not on the entire images. Only after all the intermediate transformations have been fully defined are the resulting composite transformations applied to the images themselves. This approach results in a major savings in computation.

Specifically, in one embodiment, the homographic matrix transformations to map the entire original images onto the stereo rectified image planes can be derived in the following manner. For the left and right virtual cameras, the appropriate matrices can be multiplied in the foregoing sequence. Equation (10) shows these matrix multiplications for the right camera, resulting in a homography matrix $[A_R]$. A similar matrix cascade can be constructed for the left camera. The resulting [A] matrix is the one usually prescribed for Homomorphic transformations using standard software routines, such as those available in openCV and Matlab.

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 0 & 0 & 1 \\ 0 & 1 & 0 \\ -1 & 0 & 0 \end{bmatrix} \begin{bmatrix} \cos(\varphi_R) & \sin(\varphi_R) & 0 \\ -\sin(\varphi_R) & \cos(\varphi_R) & 0 \\ 0 & 0 & 1 \end{bmatrix} \quad (10)$$

$$\begin{bmatrix} 1 & 0 & 0 \\ 0 & \cos(\pi_R) & -\sin(\pi_R) \\ 0 & \sin(\pi_R) & \cos(\pi_R) \end{bmatrix} \begin{bmatrix} \cos(\gamma_R) & 0 & \sin(\gamma_R) \\ 0 & 1 & 0 \\ -\sin(\gamma_R) & 0 & \cos(\gamma_R) \end{bmatrix}$$

Alternatively, if a custom software routine is to be constructed a scale factor is needed to normalize the [A] matrix for each image point. The normalized matrix is denoted [B] in equation (11). Normalization can be computed by multiplying the various normalization factors. Alternatively, the normalization can be performed last and the camera focal length is divided by the z value for each pixel. The result of these matrix multiplications will be to form two comprehensive normalized homography matrices, one for the left image and the other for the right image. These homography matrices are applied using standard routines to create the desired stereo rectified images.

$$\begin{bmatrix} b_{11} & b_{12} & b_{13} \\ b_{21} & b_{22} & b_{23} \\ b_{31} & b_{32} & b_{33} \end{bmatrix} = \text{scale} \begin{bmatrix} a_{11} & a_{12} & a_{13} \\ a_{21} & a_{22} & a_{23} \\ a_{31} & a_{32} & a_{33} \end{bmatrix} = \quad (11)$$

$$\frac{f}{(a_{31}x_0 + a_{32}y_0 + a_{33}f)} \begin{bmatrix} a_{11} & a_{12} & a_{13} \\ a_{21} & a_{22} & a_{23} \\ a_{31} & a_{32} & a_{33} \end{bmatrix}$$

It will be appreciated that the normalizing scale factor varies with each $x_0$, $y_0$ location in the original image. Thus, in mapping from the first image plane to the second image plane, a non-linear mapping transformation is performed.

The foregoing discussed embodiment assumes that the original camera poses or orientations are known, so that the location of the epipoles in the image planes are also known. However, it will be appreciated that the poses and epipole locations may not be known.

In accordance with an embodiment, there is provided a method for determining the epipoles, and therefore the camera poses. This method involves computing a gradient steep descent trajectory of a particular merit function. When the merit function reaches a practical minimum, the location of the epipoles will be known and may be determined in the presence of image noise and other perturbations. Creation of the desired stereo rectification matrices is automatic with this method. Furthermore, the method is significantly fast to compute.

In one embodiment, the merit function has two components which are added together. The first is a comparison of angle vectors for the left and right cameras. The second is a measurement of success in achieving stereo rectification by computing the slopes of the feature flow vectors.

The merit function will be zero when the virtual cameras are aligned with the true epipoles.

As noted above, the epipolar lines form a star, or fan, of rays which radiate out from the epipole. When the left and right cameras face each other, such that the epipoles are in the center of each image, the epipolar stars will be mirror images of each other. This is true even if one such star is somewhat rotated with respect to the companion star. As noted above, it is possible to derotate the stars to a common rotational position by picking a particular common feature and bringing that feature to the x-axis.

In one embodiment, the same process of angle alignment is used even when the locations of the epipoles are not exactly known. In attempting to point the cameras at their estimated epipoles, there will be a pointing error. In this circumstance, the left epipolar star will not be a mirror image of the right epipolar star.

However, these epipolar stars can be used to create one of the two components of the merit function. This is done in one embodiment according to the method shown in FIG. 8.

Figure 8:
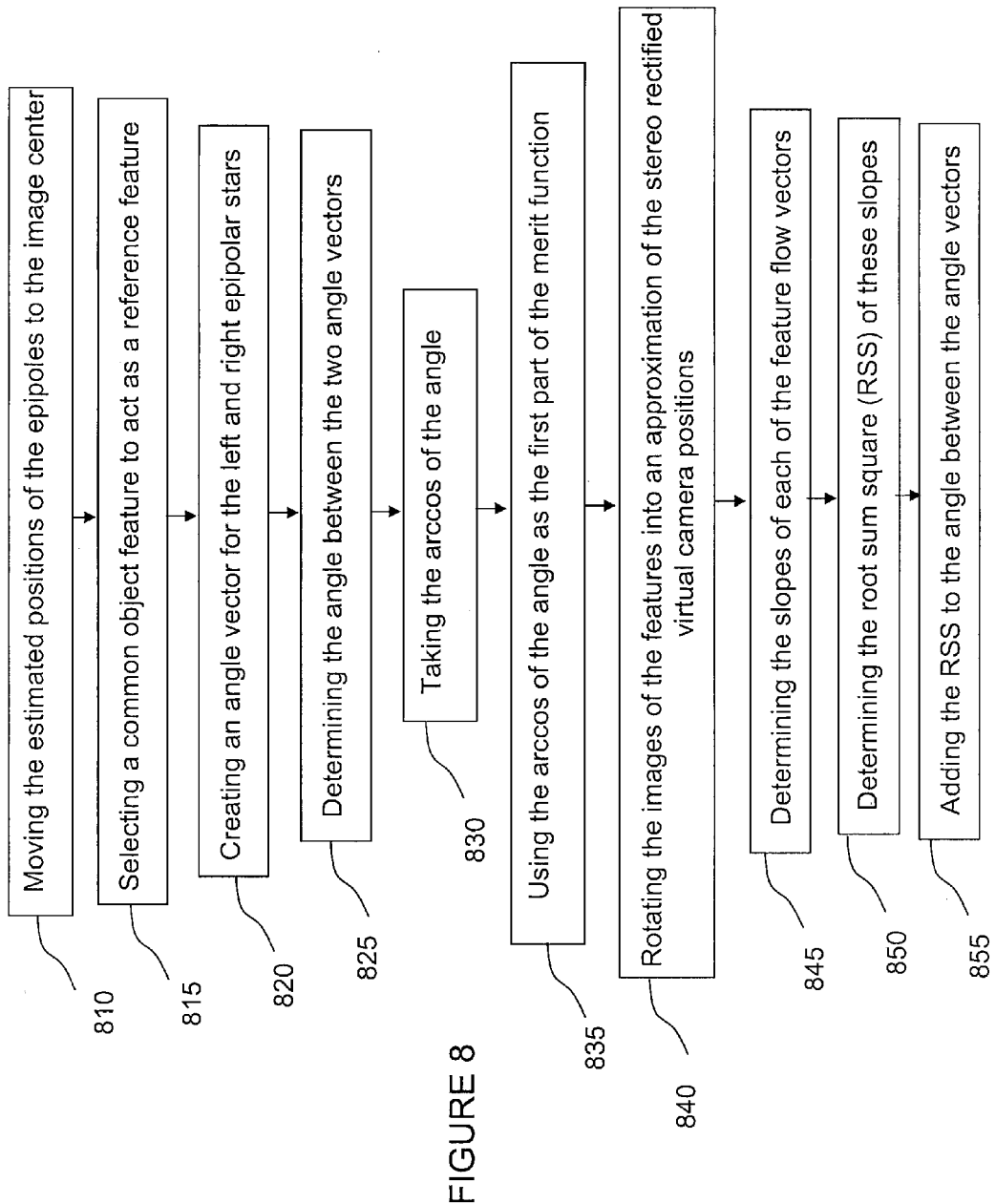
FIG. 8 shows a method for determining a merit function to be used in finding the epipole locations in accordance with an embodiment.

In the sequence shown in the method of FIG. 8, the image is actually the pattern of the locations of the object features that have been associated from the left camera to the right camera. It will be appreciated that the true images created by the cameras are not transformed through the sequence of FIG. 8.

Figure 9A:
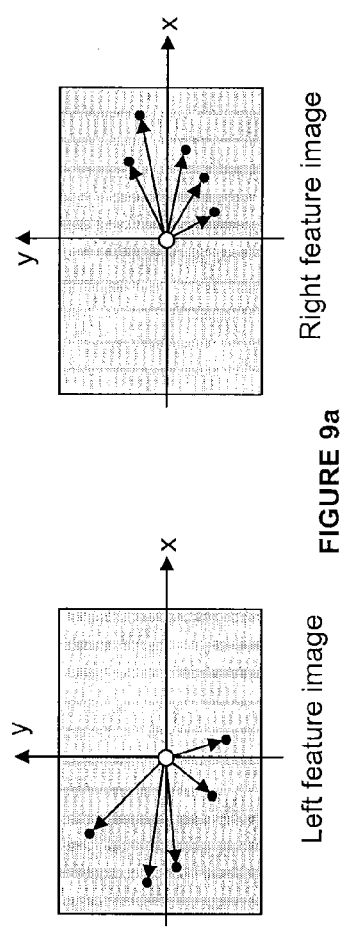
FIGS. 9a-d show various transformations performed in accordance with FIG. 8.

At operation 810 of FIG. 8, the estimated positions of the epipoles are moved to the image center (x=0, y=0). This is illustrated by FIG. 9a.

Figure 9B:
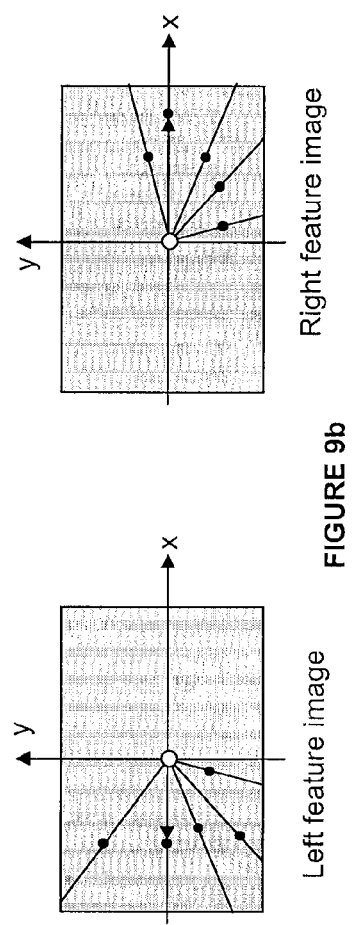

At operation 815 of FIG. 8, a common object feature is selected to act as a reference feature. Furthermore, the images are rotated so that this feature is on the x-axis. FIG. 9b shows the configuration after this rotation.

Figure 9C:
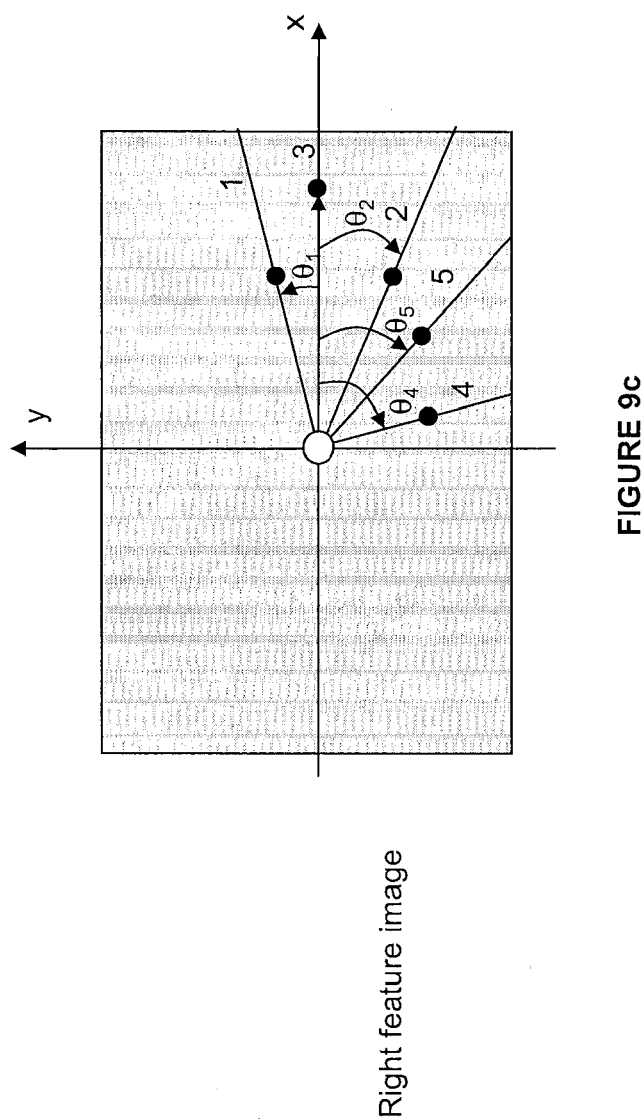

At operation 820 of FIG. 8, an angle vector is created for the left epipolar star, and a similar angle vector is created for the right epipolar star. In one embodiment, the method of creating these vectors is as follows: now that the epipolar star has been rotated such that a selected feature has been moved to the x-axis, all the angles between the epipolar lines and the x-axis are measured. A vector is created with the components of this vector being these angles: $A_{right} = \{\theta_{R1}, \theta_{R2}, \theta_{R3}, \theta_{R4}, \theta_{R5}, \ldots\}$. The situation is illustrated by FIG. 9c. It will be appreciated that the order of the features and their angles is arbitrary—provided the ordering is the same for the right and left epipolar stars: $A_{left} = \{\theta_{L1}, \theta_{L2}, \theta_{L3}, \theta_{L4}, \theta_{L5}, \ldots\}$. The ordering should be the same for the resulting vectors to be properly correlated.

Experiments have been done with fully ordered angles. These experiments do not show performance improvement when compared with an arbitrary ordering of the features and their corresponding angles. It will be appreciated that since the third feature has been moved to the x-axis, the angle for this example feature will be $\theta_{R3}=0$ and $\theta_{L3}=0$ At operation 825, the angle between these two angle vectors is determined. This can be done by correlating the right angle vector with the left angle vector, as follows:

$$cc = \frac{A_{left} \cdot A_{right}}{\|A_{left}\|\|A_{right}\|} \quad (12)$$

In equation (12), cc represents the cosinus of the correlation angle between the right angle vector and the left angle vector.

At operation 830, the correlation angle between the vectors is then given by taking the arc cosine according to:

$$\text{correlationangle} = \arccos(cc) \quad (13)$$

At operation 835, the correlation angle of equation is provided as the first part of the merit function.

The second part of the merit function is a measure of how close to horizontal the various feature flow vectors are. When they are perfectly horizontal, full stereo rectification will be achieved.

At operation 840, equations (8) and (9) are used to rotate the images of the features into an approximation of the stereo rectified virtual camera positions.

At operation 845, the slopes of each of the feature flow vectors are computed.

At operation 850, the root sum square (RSS) of these slopes is computed.

At operation 855, the RSS to the angle between the angle vectors of equation is added:

$$\text{Merit} = \text{correlation angle} + \text{RSS} \quad (14)$$

Figure 9D:
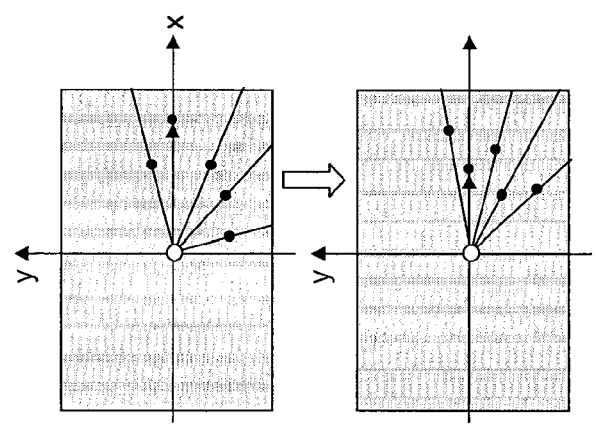
Figure 9D:
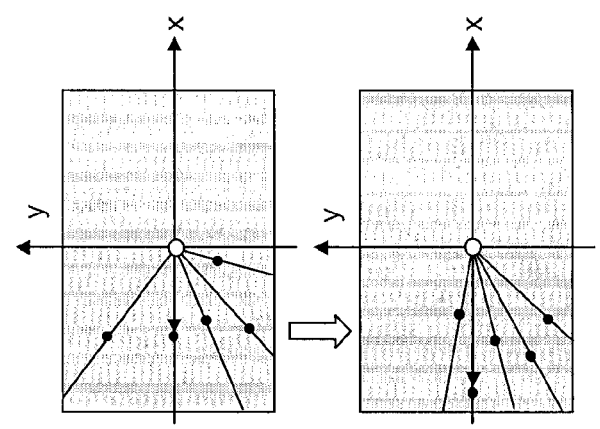

Equation (14) gives the desired merit function for the iterative determination of the true location of the epipoles and the subsequent development of the homography matrices needed for stereo rectification of the full images In one embodiment, in order to achieve stereo rectification, the system's estimates of the epipole locations is progressively moved toward the correct epipole locations. FIG. 9d shows the change in the epipolar stars as the system moves from the current estimated, but incorrect, epipole locations to the desired proper alignment with the true epipoles:

As can be seen, after alignment with the true epipoles, the radiating epipolar lines of the epipolar stars have become mirror-image identical. However, the locations of the features will, in the left and right images, be at different radial distances along the epipolar lines.

The merit function of equation (14) forms a surface in a four dimensional space. The parameters of this four dimensional space are the x and y errors of the epipole locations for the left and right cameras. When the virtual cameras are perfectly aligned with their respective epipoles, the merit function will have a value of zero. The stereo alignment task, therefore, is to find the minimum of this merit function.

The minimum of the merit function can be determined in various ways well known to the community (e.g. Newton's method). In one embodiment, this is done by performing a four dimensional gradient descent of the four-space merit function surface. It will be appreciated that all four x and y parameters should be adjusted simultaneously for the gradient descent technique to converge.

In one embodiment, the merit function is defined as a four vector:

$$M = \{mx_{left}, my_{left}, mx_{right}, my_{right}\} \quad (15)$$

Next, the gradient of M is computed as follows:

$$\nabla M = \frac{\partial M}{\partial x_{left}}\hat{i} + \frac{\partial M}{\partial y_{left}}\hat{j} + \frac{\partial M}{\partial x_{right}}\hat{k} + \frac{\partial M}{\partial y_{right}}\hat{l} \quad (16)$$

According to the definition (15), M is in a Cartesian space and is therefore separable in $x_{left}$, $y_{left}$, $x_{right}$ and $y_{right}$. Thus, the gradient can be easily computed. The following flow chart shown in FIG. 10, shows a gradient descent method in accordance with one embodiment.

Figure 10:
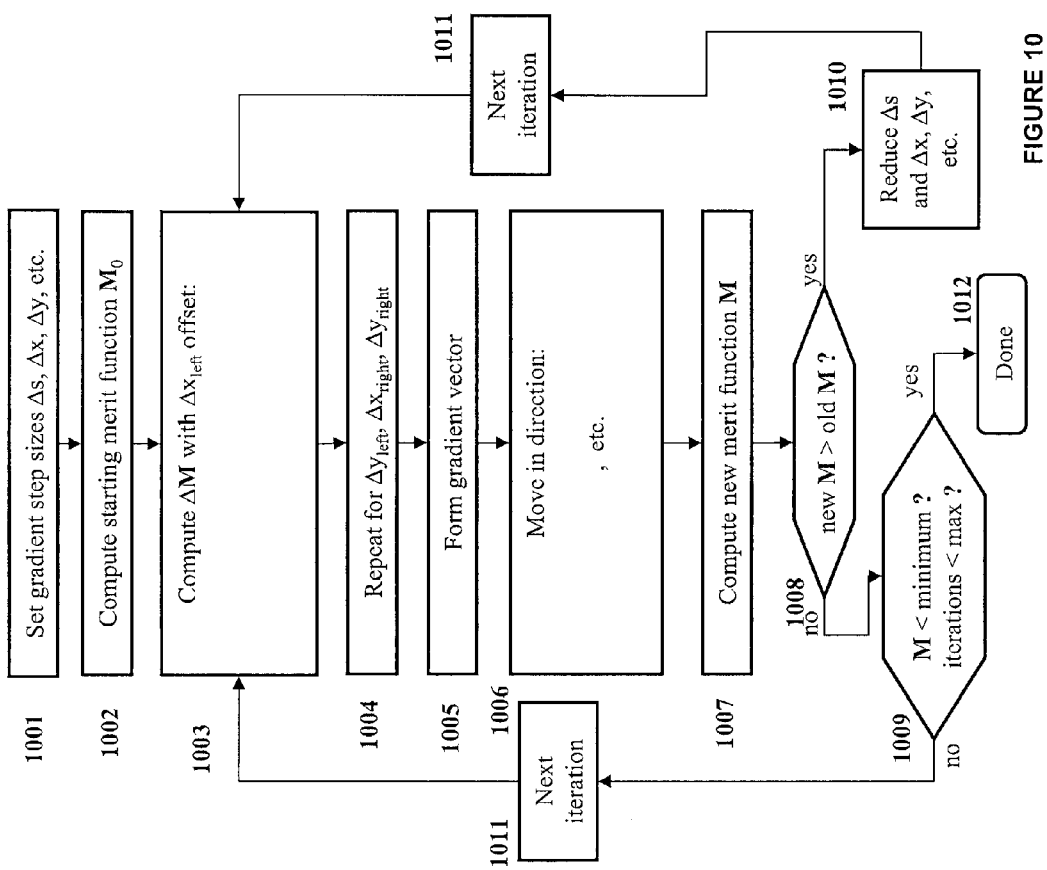
FIG. 10 shows a method for performing a gradient descent in accordance with one embodiment.

Following the operations in the flow diagram of FIG. 10, the method starts with initialization 1001. In operation 1001, the parameters for the gradient descent measurement are established. $\Delta x$ and $\Delta y$ are small offsets from the current estimate of the epipole location. They are used to determine the gradient of the merit function according to equation (16). $\Delta s$ is a step down the gradient of the merit function. It moves the estimate of the epipole location closer to the true epipole location. The new estimate of the epipole location is as follows (17):

$$\text{new.epipole.location.estimate} = \text{old.epipole.estimate} - \nabla M \cdot \delta s \quad (17)$$

The method proceeds to operation 1002 where the reference merit function, $M_0$, is computed for the initial estimated positions of the epipoles (left and right). As mentioned before, this computation involves the following sequence: (i) virtual rotations of the feature images to bring the estimated epipole locations to the centers of the image planes; (ii) rotations about the center to mutually align a selected common feature; (iii) computation of the angle between the vectors whose components are the angles of the epipolar lines; (iv) 90° rotations of the virtual feature images to create the current best estimate of the stereo rectified virtual camera positions; (v) obtaining the Root Sum Square (RSS) of the slopes of the feature motion flow lines is computed; (vi) computing the starting Merit Function.

At operations 1003, 1004 and 1005, the gradient of the merit function is computed. The procedure is done to move the left and right virtual cameras, in sequence, small distances $\Delta x$ and $\Delta y$ away from the current epipole locations, for the left and right virtual cameras, respectively. With each such small displacement the merit function is again measured. This sequential measurement process will give the four differential components of the four dimensional gradient of the merit function.

Operation 1006 shows how to move along the four dimensional Merit Function surface. The equation in the box is the same as equation (17), above. Even though $\delta s$ is constant, the distance moved along the surface changes as the gradient of the Merit Function changes. It is supposed that this surface resembles a paraboloid. This is reasonable because the merit function is expected to change smoothly to zero as the virtual cameras move ever closer to true epipolar alignment. Then, as one nears the bottom of the merit function surface, the gradient becomes less and the distance moved with each iteration becomes proportionately less. At the very bottom the surface is expected to be nearly flat and the gradient to be nearly zero. The steps then become extremely small and further progress takes a progressively increasing number of iterations.

At operation 1007, the next phase of the iterative process is started. The system has now moved a short distance towards the true epipoles. A new reference merit function is calculated which is to be compared with the previous reference merit function.

Operation 1008 makes this comparison and decides between two courses of action. If the new merit function is greater than the old, the system proceeds to operation 1010. If the function is less than before, the system proceeds to operation 1009.

Operation 1009 conducts two tests in parallel. The first test checks to see if the merit function has fallen below some prespecified minimum value. If it has, then the system is said to have acceptably converged to the true epipoles. Whereupon the system goes to operation 1012 and exits the iterative search for the epipoles. Alternatively, it is also appropriate to establish a maximum number of iterations so that the calculation can be forced to terminate. If this maximum is exceeded, the system also exits the iterative loop and therefore accepts the current estimate of the epipole locations as the best that can be achieved in a reasonable computation time.

If neither of these exit conditions have been met, the system proceeds to the next iteration, operation 1011. In so doing, the most recently calculated merit function (calculated in operation 7) now becomes the new reference merit function.

Figure 11:
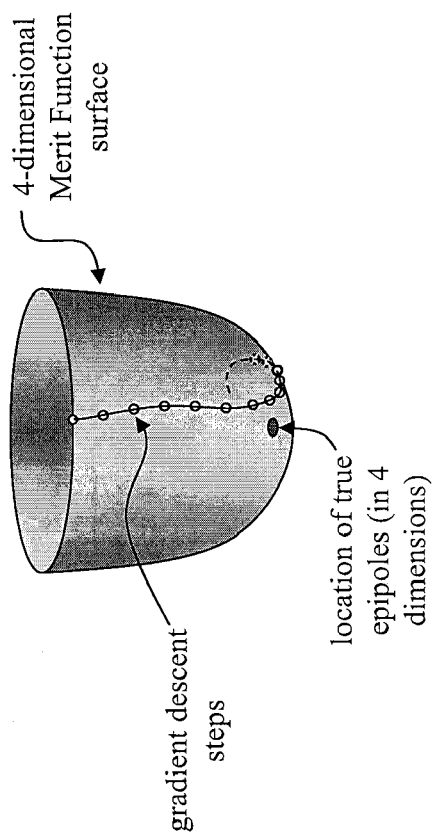
FIG. 11 illustrates the gradient descent of FIG. 10 in accordance with an embodiment.

Operation 1010 is reached when the test in operation 1008 shows that the merit function is starting to increase in value. This means that the system has, for some reason, moved past the positions of the true epipoles. FIG. 11 shows how this might happen. One way is that the gradient descent trajectory simply misses the epipole location and starts to climb back up the merit function surface. In this case the system will automatically correct, but the trajectory will tend to orbit the true epipole location before it settles down. This trajectory orbiting can substantially increase the number of iterations. Another possibility is that the gradient steps remain too large as the trajectory approaches the true epipole location. In this case the discontinuous trajectory can leap over the true epipole location and start to climb back up the surface. Again, eventually the system settles to the true epipoles, but the computation burden is substantially increased.

The solution to the problem is to detect when the trajectory starts to climb up the surface and, then, diminish the size of the search steps. Typically, $\Delta x$, $\Delta y$ and $\delta s$ are cut in half in operation 1010, although other scale adjustments may give acceptable performance.

Once these adjustments have been made, the system proceeds (through operation 1011) to the next iteration.

These iterations continue until (in operation 1009) an exit criterion has been met and the system exits to operation 1012.

The method of FIG. 10 has the property that it is of Order (n) where n is the number of features observed. This means that the computational burden increases in linear proportion to the number of features that have been extracted from the scene and tracked. Thus, increasing the number of features from 10 to 100 only increases the processing burden by a factor of 10.

By way of contrast, existing methods or algorithms are of Order($n^3$), or greater. With those algorithms an increase in tracked features from 10 to 100 will increase the processing burden by a factor of 1000, or more. Thus, it will be appreciated that the method of FIG. 10 is significantly faster than existing computing methods or algorithms.

A second factor which influences the computation burden is the magnitude of the initial error in estimating the position of the epipoles. Experiments indicate that the computational burden increases faster than the angular error in the epipole estimation. Thus, in one embodiment, it is desirable to minimize this initial estimation error.

Referring now to FIGS. 12*a-i*, these figures show how rapid convergence to excellent stereo rectification can be obtained on an ensemble of 20 features by applying the method of FIG. 10. The experiment shown in FIGS. 12*a-e* assumes that the true location of the epipoles is only approximately known. The assumed error is quite large, being on the order of 20° for each epipole. This experiment shows rapid convergence to excellent stereo rectification with relatively few iterations.

FIG. 12*a* shows the initial set of feature flow vectors between the left and right cameras. The ensemble consists of 20 features.

FIG. 12*b* shows the flow vectors after rotation of the virtual cameras to the open-loop estimated locations of the epipoles. The errors in these open-loop estimated positions are approximately 20°. There clearly has been some unraveling of the flow vectors. In particular, the flow vectors have reversed direction and are now flowing roughly correctly.

FIG. 12*c* shows the results after a single iteration down the merit function surface. There is some improvement, but the improvement is subtle in appearance.

FIG. 12*d* shows the results after 10 iterations. The improvement is now quite noticeable. However, there are still substantial slope errors, which indicate that the system has not quite converged onto the true epipoles. A significant range error exists at this stage.

FIG. 12*e* indicates that after 100 iterations the convergence to the true epipoles is nearly perfect.

A second experiment shows that as the initial estimate of the epipole locations improves, the algorithm will more rapidly, and accurately converge to the true locations of the epipoles.

In FIG. 12*f* we see the attempted stereo rectification when there is a 3° error in the initial estimation of the locations of the epipoles. This is before gradient descent of the merit function surface so rectification has not been achieved, but it is evident that the flow slope errors are relatively small.

FIG. 12*g* shows the improvement after only one iteration.

FIG. 12*h* shows the result after 10 iterations. The rectification is not perfect, but it is good enough to be useful. Only slight distortions and range errors will result from using this rectification for 3D modeling of the scene.

After 100 iterations, the result is shown in FIG. 12*i*. The resemblance between FIG. 12*h* and FIG. 12*i* indicates that convergence to the true epipoles has been usefully accomplished, though not perfect, in only 10 iterations. Thus, it will be appreciated that there is a significant benefit to starting with a relatively accurate estimate of the epipole locations.

Figure 13:
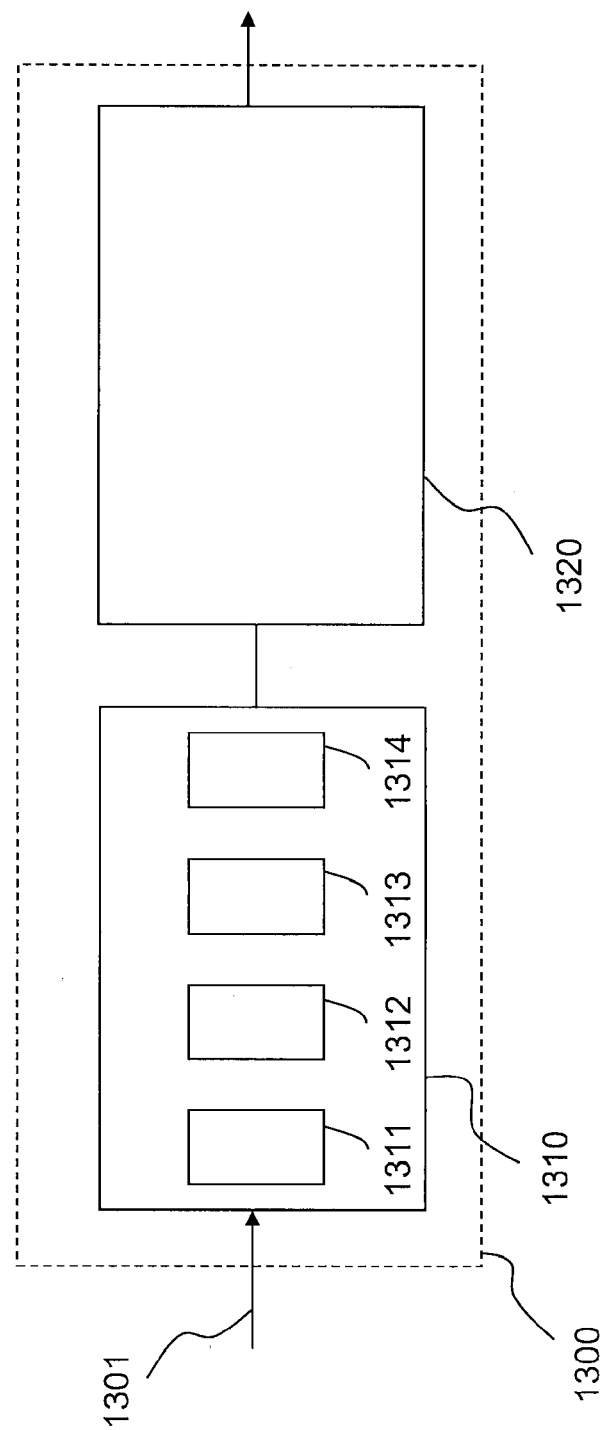
FIG. 13 shows a system for processing images in accordance with one embodiment.

Referring to FIG. 13, this figure shows a system 1300 for processing images in accordance with one embodiment.

The system 1300 includes a stereo rectification module 1310 configured to stereo rectify images and an image processing module 1320. Module 1310 is configured to receive a stream of images 1301 (e.g. captured in real-time). Module 1310 includes an epipole determination module 1311 configured to, for each image of the pair of images, determine a position of an epipole in an image plane associated with a first camera orientation of a camera that captures said image. Module 1310 also includes an epipole positioning module 1312 configured to, for each image of the pair of images, position the epipole in a center of a virtual image plane associated with a second camera orientation of the camera. Module 1310 further includes an alignment module 1313 configured to align the pair of images relative to each other around a stereo base line that intersects the epipoles of the pair of images. Moreover, module 1310 includes an image rotation module 1314 configured to rotate each virtual image plane to position the virtual image plane substantially parallel to the stereo base line so as to obtain a stereo rectified pair of image planes.

The image processing module 1320 is configured to perform one or more transformations (e.g. homographic matrix transformations) to map the entire original images onto the stereo rectified image planes.

The different modules of FIG. 13 may include one or more processors, memories and/or dedicated circuitries to carry out the required operations.

The methods described above can be used to stereo rectify images in many applications, including, for example, military and commercial applications. Military applications may include: improved situational awareness; persistent surveillance; training; battle rehearsal; target recognition and targeting; GPS denied precision navigation; sensor fusion; mission system integration; and military robotics. Commercial and industrial application may include: geography and mapping; motion picture and television applications; architecture and building planning; advertising; industrial and general robotics; police and fire protection and school instruction. However, this is not limiting. It is envisioned to use the above described methods and systems in other applications.

Furthermore, the processing of the images described according to the above embodiments can be performed in real-time.

It will be appreciated that the different operations involved in processing the images may be executed by hardware, software or a combination of hardware and software. Software may include machine executable instructions or codes. These machine executable instructions may be embedded in a data storage medium of the processor module. For example, the machine executable instructions may be embedded in a data storage medium of modules 1310, 1311, 1312, 1313, 1314 and 1320 of the system of FIG. 13.

The software code may be executable by a general-purpose computer. In operation, the code and possibly the associated data records may be stored within a general-purpose computer platform. At other times, however, the software may be stored at other locations and/or transported for loading into an appropriate general-purpose computer system. Hence, the embodiments discussed above involve one or more software or computer products in the form of one or more modules of code carried by at least one physical, non-transitory, machine-readable medium. Execution of such codes by a processor of the computer system enables the platform to implement the functions in essentially the manner performed in the embodiments discussed and illustrated herein.

As used herein, terms such as computer or machine "readable medium" refer to any medium that participates in providing instructions to a processor for execution. Such a medium may take many forms, including, non-transitory non-volatile media and volatile media. Non-volatile media include, for example, optical or magnetic disks, such as any of the storage devices in any computer(s) operating as discussed above. Volatile media include dynamic memory, such as the main memory of a computer system. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge. Many of these forms of computer readable media may be involved in carrying one or more sequences of one or more instructions to a processor for execution.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for stereo rectifying a pair of images, the method comprising:

for each image of the pair of images, estimating a position of an epipole in an image plane associated with a first camera orientation of a camera that captures said image;

calculating a function forming a surface in a four dimensional space and resembling a paraboloid, using said estimated position in each image, the four dimensional space having parameters for errors of said estimated position of the epipole in each image;

calculating a four dimensional gradient descent of the function using initial values for said parameters for errors of said estimated position;

repeating said calculating a four dimensional gradient descent using reduced values for said parameters for errors of said estimated position until the calculated function is less than a predetermined value, to determine a minimum of said function;

determining a true position of the epipole from said minimum of said function;

for each image of the pair of images, positioning the epipole with the true position in a center of a virtual image plane associated with a second camera orientation of said camera;

subsequent to said positioning, aligning the pair of images relative to each other by rotating around a stereo base line that intersects the epipoles of the pair of images, and rotating the virtual image planes to position said virtual image planes substantially parallel to the stereo base line and their normal vectors substantially parallel to each other so as to obtain a stereo rectified pair of image planes, wherein the method is performed by one or more processors.

2. The method of claim 1, wherein the pair of images is captured by different cameras.

3. The method of claim 1, wherein the pair of images is captured by a moving camera.

4. The method of claim 1, wherein, after positioning the epipole in the center of the virtual image plane, the virtual image planes of the pair of images are substantially parallel to each other.

5. The method of claim 1, wherein the aligning comprises selecting a reference image feature that is common to both images in their respective virtual image planes, and positioning each virtual image plane around the stereo base so that a positioning of the reference image feature in the virtual plane of one of the pair of images matches a positioning of the reference image feature in the virtual plane of the other image of the pair of images.

6. The method of claim 5, wherein the reference image feature is an object in the image that is closest to a true horizon.

7. The method of claim 1, wherein, for each image, the virtual image plane is obtained by first, rotating the image plane to position the epipole along a first axis of a coordinate system centered at a camera center; and second, rotating the image plane to position the epipole along a second axis of the coordinate system, thereby positioning the epipole in the center of the virtual plane.

8. The method of claim 1, wherein, after rotating the virtual image planes to position said virtual image planes substantially parallel to the stereo base line, each of the virtual planes are associated with a third camera orientation.

9. The method of claim 1, wherein parameters of the four dimensional space are x and y errors of the epipole position of each image.

10. An article of manufacture comprising a physical, non-transitory computer readable medium encoded with machine executable instructions for performing a method for stereo rectifying a pair of images, the method comprising:
  for each image of the pair of images, estimating a position of an epipole in an image plane associated with a first camera orientation of a camera that captures said image;
  calculating a function forming a surface in a four dimensional space and resembling a paraboloid, using said estimated position in each image, the four dimensional space having parameters for errors of said estimated position of the epipole in each image;
  calculating a four dimensional gradient descent of the function using initial values for said parameters for errors of said estimated position;
  repeating said calculating a four dimensional gradient descent using reduced values for said parameters for errors of said estimated position until the calculated function is less than a predetermined value, to determine a minimum of said function;
  determining a true position of the epipole from said minimum of said function;
  for each image of the pair of images, positioning the epipole with the true position in a center of a virtual image plane associated with a second camera orientation of said camera;
  subsequent to said positioning, aligning the pair of images relative to each other by rotating around a stereo base line that intersects the epipoles of the pair of images, and
  rotating the virtual image planes to position said virtual image planes substantially parallel to the stereo base line and their normal vectors substantially parallel to each other so as to obtain a stereo rectified pair of image planes.

11. The article of claim 10, wherein the pair of images is captured by different cameras.

12. The article of claim 10, wherein the pair of images is captured by a moving camera.

13. The article of claim 10, wherein, after positioning the epipole in the center of the virtual image plane, the virtual image planes of the pair of images are substantially parallel to each other.

14. The article of claim 10, wherein the aligning comprises selecting a reference image feature that is common to both images in their respective virtual image planes, and positioning each virtual image plane around the stereo base so that a positioning of the reference image feature in the virtual plane of one of the pair of images matches a positioning of the reference image feature in the virtual plane of the other image of the pair of images.

15. The article of claim 14, wherein the reference image feature is an object in the image that is closest to a true horizon.

16. The article of claim 10, wherein, for each image, the virtual image plane is obtained by first rotating the image plane to position the epipole along a first axis of a coordinate system centered at a camera center; and second rotating the image plane to position the epipole along a second axis of the coordinate system, thereby positioning the epipole in the center of the virtual plane.

17. The article of claim 10, wherein, after rotating the virtual image planes to position said virtual image planes substantially parallel to the stereo base line, each of the virtual planes are associated with a third camera orientation.

18. The method of claim 10, wherein parameters of the four dimensional space are x and y errors of the epipole position of each image.

* * * * *